United States Patent
Kondo et al.

(10) Patent No.: US 7,907,332 B2
(45) Date of Patent: Mar. 15, 2011

(54) WIDE-BAND ULTRASHORT-PULSE OPTICAL OSCILLATOR UTILIZING CHIRPED PULSE AMPLIFICATION

(75) Inventors: Kiminori Kondo, Mino (JP); Takashige Omatsu, Chiba (JP)

(73) Assignees: Osaka University, Osaka (JP); National University Corporation Chiba University, Chiba (JP)

( * ) Notice: Subject to any disclaimer, the term of this patent is extended or adjusted under 35 U.S.C. 154(b) by 150 days.

(21) Appl. No.: 12/227,724

(22) PCT Filed: May 24, 2007

(86) PCT No.: PCT/JP2007/060634
§ 371 (c)(1),
(2), (4) Date: Nov. 25, 2008

(87) PCT Pub. No.: WO2007/138983
PCT Pub. Date: Dec. 6, 2007

(65) Prior Publication Data
US 2009/0168148 A1    Jul. 2, 2009

(30) Foreign Application Priority Data
May 26, 2006  (JP) .................. 2006-146584

(51) Int. Cl.
*G02F 1/35* (2006.01)
*H01S 3/08* (2006.01)
(52) U.S. Cl. .................. 359/330; 372/94; 372/105
(58) Field of Classification Search .......... 359/326–332; 372/21, 22, 92, 94, 98–102, 105
See application file for complete search history.

(56) References Cited

U.S. PATENT DOCUMENTS
5,079,772 A    1/1992 Negus et al.
(Continued)

FOREIGN PATENT DOCUMENTS
JP    4-302188    10/1992
JP    4-361580    12/1992
(Continued)

OTHER PUBLICATIONS
Jovanovic, I. et al. "Hybrid chirped-pulse amplification", Optics Letters, vol. 27, No. 18, Sep. 15, 2002, p. 1622-1624.

*Primary Examiner* — Daniel Petkovsek
(74) *Attorney, Agent, or Firm* — Hamre, Schumann, Mueller & Larson, P.C.

(57) ABSTRACT

A wide-band ultrashort-pulse optical oscillator includes: an optical amplification medium 1 that optically amplifies an incident light having a wide band or a plurality of bands so as to be converted into an oscillation light emitted from an optical resonator; an energy injection element 2 that either injects energy into the optical amplification medium so that light energy is generated, or injects light energy into the optical amplification medium; a negative dispersion element 4 that imparts a negative dispersion to a pulse light of the oscillation light; a mode locker 9 that produces a mode-locking with respect to the pulse light; a positive dispersion element 11 that imparts a positive dispersion to the pulse light; and an optical system formed so that the pulse light passes through a loop-like optical path from the optical amplification medium via the negative dispersion element, the mode locker, and the positive dispersion element, back to the optical amplification medium in at least one of the stated direction and an opposite direction. With this, it is possible to generate an ultrashort-pulse light in a wide band, with a high degree of efficiency.

8 Claims, 4 Drawing Sheets

U.S. PATENT DOCUMENTS

| | | | |
|---|---|---|---|
| 5,579,152 A * | 11/1996 | Ellingson et al. | 359/330 |
| 6,181,463 B1 | 1/2001 | Galvanauskas et al. | |
| 6,249,630 B1 * | 6/2001 | Stock et al. | 385/123 |
| 6,618,423 B1 | 9/2003 | Dekorsy et al. | |
| 7,072,101 B2 * | 7/2006 | Kapteyn et al. | 359/337.5 |
| 7,474,457 B2 * | 1/2009 | Krausz et al. | 359/326 |
| 2006/0181789 A1 | 8/2006 | Matsuda et al. | |

FOREIGN PATENT DOCUMENTS

| | | |
|---|---|---|
| JP | 8-70151 | 3/1996 |
| JP | 10-268369 | 10/1998 |
| JP | 2001-168437 | 6/2001 |
| JP | 2003-500861 | 1/2003 |
| JP | 2004-287243 | 10/2004 |
| WO | WO 2006008135 A2 * | 1/2006 |

* cited by examiner

WIDE-BAND ULTRASHORT-PULSE OPTICAL OSCILLATOR UTILIZING CHIRPED PULSE AMPLIFICATION

TECHNICAL FIELD

The present invention relates to an oscillator for obtaining efficiently an ultrashort-pulse light that is used in a high-intensity laser system, and particularly to an oscillator for obtaining a wide-band ultrashort-pulse light by utilizing chirped pulse amplification.

BACKGROUND ART

In a laser oscillator for a conventional high-intensity laser system, when an ultrashort-pulse light is to be generated, the mode locking is caused for synchronizing the modes of electromagnetic waves that are resonatable in an optical resonator (oscillator), whereby the generation of an ultrashort-pulse light is enabled. For example, when a titanium-sapphire crystal that provides an extremely wide gain bandwidth for a laser is used as a laser medium, by causing the mode locking, an ultrashort-pulse light of not more than 10 fs can be generated. Since a titanium-sapphire crystal provided in an oscillator exhibits the optical Kerr effect in which a refractive index increases as a light intensity increases, the Kerr lens mode-locking method for synchronizing phases of modes by using the optical Kerr effect is used dominantly, as the mode-locking method with use of the titanium-sapphire laser.

In the conventional Kerr lens mode-locking method, a band of a pulse oscillator is determined according to, for example, a property of a titanium-sapphire crystal, though some pulse oscillators have a band higher than 10 fs. More specifically, since a laser element for obtaining a gain and a mode-locking element (mode locker) are performed by one element and a transmission-type solid substance is used for forming the element for producing a gain in an oscillator, when a wide-band pulse passes the same, a dispersion (a relative phase difference owing to a frequency difference) occurs. Accordingly, in order to generate an ultrashort pulse, that is, a transform-limited pulse, it is necessary to compensate a positive dispersion that is caused by a transmission optical medium through which the pulse passes in the resonator. For this purpose, a prism pair or a chirping mirror is disposed as a negative dispersion element in the optical resonator.

Further, as an effective method for obtaining an ultrashort-pulse high-intensity laser, the chirped pulse amplification method (CPA method) is known. Laser light has an almost uniform wavelength as compared with natural light, but still has a definite spectrum width (a wavelength distribution of waves contained in light) even though it is very small. In the CPA method, first, a time width (pulse width) of laser light outputted from a laser oscillator is expanded (pulse expansion) by using this spectrum width. This laser light is called "chirped pulse".

The chirped pulse has a pulse height (output power) that is decreased for the foregoing expansion of the pulse width. This chirped pulse is amplified by a laser amplifier, so that an output power thereof is increased to the highest limit that barely avoids damage to a laser medium. The amplification of the chirped pulse requires a laser medium having a property of being capable of amplification even if there are differences in wavelengths to some extent (even if the pulse has a spectrum width). One principal example of the laser medium having such a property is a titanium-sapphire crystal. The laser light (chirped pulse) thus amplified to the limit of the laser medium damage is shortened in terms of time (pulse compression) by utilizing the wavelength difference. The height (output power) of the pulse is increased for the decrease in the pulse width, which results in that laser light having an ultrahigh output power higher than the limit value regarding the laser medium damage can be obtained.

Further, Patent Document 1 discloses a parametric chirped pulse amplifier device as shown in FIG. 4. This device is intended to convert a light pulse generated by a long pulse pump light source such as a diode, a fiber, or a solid laser, into a high-energy ultrashort light pulse, by using an optical parametric amplification medium. An excitation source 100 is used for generating an excitation light pulse for a predetermined duration, and is composed of an excitation diode 110 and a pulse source 120. A signal source 130 is composed of an oscillator 140 and an expander 150, and generates a signal light pulse. Both of the light pulses are coupled by optical coupling means 160, whereby a coupled light pulse is generated. A parametric amplifier 170 having a quasi-phase matching (QPM) crystal receives the coupled light pulse, and amplifies the signal light pulse with the energy of the excitation light pulse. The signal pulse thus amplified is compressed by a compressor 180. Since the parametric chirped pulse amplification is performed by the parametric amplifier 170 whereby a signal light pulse can be amplified significantly with use of an excitation light pulse having a low peak power, an ultrashort light pulse having a high energy is output from the compressor 180.

One of several important advantages of the parametric chirped pulse amplification is to enable the utilization of a long pulse pump light source. Generally, such a light source is not complicated, and is capable of supplying sufficient high energy for directly generating and amplifying an ultrashort pulse.

Patent document 1:. JP 10(1998)-268369 A

DISCLOSURE OF INVENTION

Problem to be Solved by the Invention

In the conventional Kerr lens mode-locking method, since a laser element for obtaining a gain and a mode locker are performed by one element, consideration has to be given to achieving excellent characteristics regarding both of the gain producing function and the mode-locking function. Therefore, it is difficult to configure an ultrashort-pulse optical oscillator so that a sufficiently wide-band ultrashort-pulse light can be obtained with a great gain.

Further, the optical parametric amplification is an effective method for obtaining a wide-band ultrashort-pulse light, but an optical parametric amplifier is required to have a mode-locking function. For this reason, there is the same problem as that of the above-described Kerr lens mode-locking method. On the other hand, unlike the normal laser amplification function, the optical parametric amplification function does not involve energy accumulation in a gain medium, and a gain of an amplifier is produced only while an excitation light exists. Accordingly, whereas strong dependence does not exist between the excitation time interval or the pulse repetition and the mode locking in the mode-locking method utilizing the laser amplification function, the dependence significantly influences when the mode locking is intended to be obtained by the optical parametric amplification. Since a usual excitation pulse light source has a long pulse width, or in extreme cases, a pulse that is continuous in terms of time, the pulse width intended to be obtained by an oscillator and the pulse width of the excitation light consequently differ from each other significantly. As a result, the following inconvenience occurs: a generated pulse has a too long pulse width; or the mode locking does not occur.

Further, in the case where the Kerr lens mode-locking method is used, an output from the mode-locking optical oscillator has a Gaussian-type pulse waveform when the mode locking is perfect. In other words, it is impossible to output a light pulse in an arbitrary waveform from a laser oscillator. This applies to cases where other mode-locking methods are used. Therefore, in many cases, a light pulse having an arbitrary time waveform is created by causing a light pulse output from a mode-locking optical oscillator to pass through an optical synthesizer composed of, for example, a spatial light modulator and a 4f optical system, and the light pulse thus created is utilized in spectroscopic experiments and the like. In such cases, the power loss in the optical synthesizer and the complexity of the experiment system cannot be avoided.

As described above, it is difficult to obtain a sufficiently wide-band ultrashort-pulse light with use of the conventional technology, and the degree of freedom of selecting a central wavelength is not sufficient.

It is an object of the present invention to provide a wide-band ultrashort-pulse optical oscillator that is capable of generating an ultrashort-pulse light in a wide band with a high degree of efficiency.

It also is an object of the present invention to provide a wide-band ultrashort-pulse optical oscillator capable of obtaining an ultrashort-pulse light waveform with a greater degree of freedom, with a simple configuration in which the need for additional optical elements is suppressed.

Means for Solving Problem

In order to achieve the above-described objects, a wide-band ultrashort-pulse optical oscillator of the present invention includes: at least one optical amplification medium that optically amplifies an incident light having a wide band or a plurality of bands so as to be converted into an oscillation light emitted from an optical resonator; an energy injection element that either injects energy into the optical amplification medium so that light energy is generated, or injects light energy into the optical amplification medium; a negative dispersion element that imparts negative dispersion to a pulse light of the oscillation light; a mode locker that produces a mode-locking with respect to the pulse light; a positive dispersion element that imparts positive dispersion to the pulse light; and an optical system formed so that the pulse light passes through a loop-like optical path from the optical amplification medium via the negative dispersion element, the mode locker, and the positive dispersion element, back to the optical amplification medium in at least one of the stated direction and an opposite direction.

Effects of the Invention

In the wide-band ultrashort-pulse optical oscillator having the above-described configuration, the optical amplification medium for obtaining a gain and the mode locker for the mode locking are provided independently. Therefore, the mode locking can be achieved effectively by thinning the mode locker to an ultimate limit such that a nonlinear chirp can be ignored so that the wavelength dispersion of a resonator can be suppressed to an ultimate limit, while a high gain can be obtained by the optical amplification medium that amplifies a pulse light having been subjected to positive dis-persion. Thus, a wide-band high-intensity ultrashort-pulse light can be generated with a high degree of efficiency.

Figure 1:
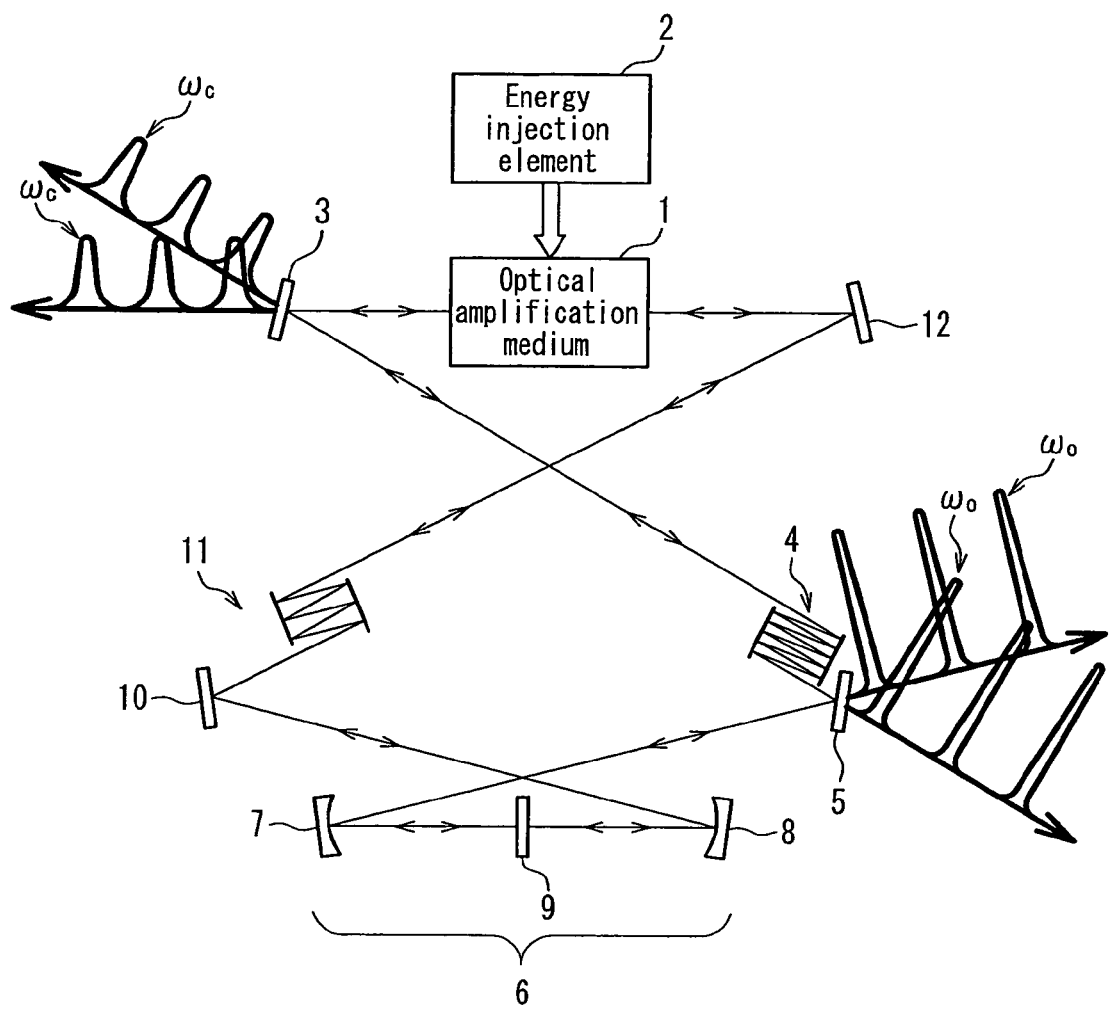
FIG. 1 is a conceptual diagram illustrating a configuration of a wide-band ultrashort-pulse optical oscillator according to Embodiment 1 of the present invention.

DESCRIPTION OF REFERENCE NUMERALS 1 optical amplification medium
2 energy injection element
3, 5, 10, 12 mirror
4 negative chirping mirror
6 mode locking part
7, 8 concave mirror
9 mode locker
11 positive chirping mirror
13 nonlinear optical crystal
14 excitation light source
20 frequency modulation part
21, 22 frequency modulator
23, 24 exiting mirror
100 excitation source
110 excitation diode
120 pulse source
130 signal source
140 oscillator
150 expander
160 optical coupling means
170 parametric amplifier
180 compressor
$\omega_c$ positive chirped wide-band pulse light
$\omega_i$ idler light
$\omega_m$ modulated light pulse
$\omega_o$ wide-band ultrashort-pulse light
$\omega_p$ excitation light
$\omega_s$ signal light

DESCRIPTION OF THE INVENTION

The wide-band ultrashort-pulse optical oscillator of the present invention may have the following variations based on the above-described configuration.

More specifically, the optical amplification medium preferably is a nonlinear optical crystal for converting the light energy by optical parametric amplification, and an excitation light source is provided for supplying the nonlinear optical crystal with an excitation light for the optical parametric amplification. With this configuration in which the non-co-axial optical parametric process is used as the gain process, and besides, the mode-locking part and the gain part are provided separately by utilizing the concept of the CPA method, it is possible to generate an ultrashort-pulse light even if an excitation light has a long pulse width.

This configuration preferably is modified so that the pulse light passes through the loop-like optical path in the stated direction; the negative dispersion element imparts a negative dispersion to the pulse light exiting from the optical amplification medium; the mode locker produces a mode-locking with respect to the pulse light dispersed negatively by the negative dispersion element; and the positive dispersion element imparts a positive dispersion to the pulse light mode-locked by the mode locker.

Further, preferably, the excitation light source and the optical system are arranged so that the pulse light and the excitation light are incident in the nonlinear optical crystal in a non-coaxial relation so that respective optical axes of the pulse light and the excitation light cross each other at a predetermined angle, whereby amplification is produced through a non-coaxial optical parametric oscillation process.

In the wide-band ultrashort-pulse optical oscillator configured as described above, since in the optical parametric amplification process, a gain is produced only when an excitation light is present, the efficiency of the optical parametric amplification is maximized, and further, the pulse widths of the excitation pulse and the signal light pulse are adjusted so as to match each other, so that damage to the crystal is avoided. For this purpose, it is effective to use a negative dispersion element and a positive dispersion element in the complementary relationship. In other words, by imparting a positive dispersion to a pulse light before being incident in a nonlinear optical crystal, a pulse width of the pulse light is expanded sufficiently in the nonlinear optical crystal that is a part where a gain is produced. By so doing, the oscillation pulse width and the gain maintaining time are matched, whereby a sufficient degree of efficiency can be achieved. Even if the gain maintaining time of the pulse light is expanded, a light pulse incident in the mode locker provided separately from the nonlinear optical crystal can be shortened to an ultimate limit by the negative dispersion element.

The negative dispersion element preferably imparts a negative dispersion to the pulse light so that a transform-limited pulse is formed.

The chirping mirrors can be used as the negative dispersion element and the positive dispersion element.

The wide-band ultrashort-pulse optical oscillator of one of the above-described configurations may be modified so that, between the negative dispersion element and the mode locker, a pair of frequency modulators that are in a complementary relationship with each other are interposed, and an exiting mirror is disposed for taking out a pulse light from between the pair of frequency modulators. This makes it possible to configure an ultrashort-pulse optical oscillator capable of taking out a light pulse having an arbitrary waveform.

The following describes embodiments of the present invention while referring to the drawings.

EMBODIMENT 1

FIG. 1 is a conceptual diagram illustrating a configuration of a wide-band ultrashort-pulse optical oscillator according to Embodiment 1 of the present invention.

This optical oscillator includes an optical amplification medium 1, an energy injection element 2, a negative dispersion element 4, a mode-locking part 6, and a positive dispersion element 11. The mode-locking part 6 is composed of a pair of concave mirrors 7 and 8, and a mode locker 9. A pulse light exiting from the optical amplification medium 1 is guided to the negative chirping mirror 4 via a mirror 3, and is incident in the mode-locking part 6 via a mirror 5. The pulse light passes through the concave mirror 7, the mode locker 9, and the concave mirror 8 so as to exit from the mode-locking part 6. Then, after passing through a mirror 10, the positive dispersion element 11, and a mirror 12, the pulse light is incident in the optical amplification medium 1.

The optical amplification medium 1 has a function of performing optical amplification with respect to an incident light having a wide band or a plurality of bands, and converting light energy into an oscillation light emitted from an optical resonator. For example, a laser medium can be used as the optical amplification medium 1. It should be noted that, however, a medium having a wide gain band, for example, a medium such as titanium-sapphire, has to be used. The number of the optical amplification medium 1 is not limited to one, but a plurality of optical amplification media may be used. The energy injection element 2 has either a function of injecting energy into the optical amplification medium 1 so as to generate light energy, or a function of injecting light energy into the optical amplification medium 1. In the case where the optical amplification medium 1 is a laser medium, a device that supplies an electronic beam, for example, can be used as the energy injection element 2.

The negative dispersion element 4 imparts negative dispersion to the pulse light of an oscillation light emitted from the optical amplification medium 1. The mode locker 9 produces a mode-locking with respect to the pulse light that has been subjected to negative dispersion by the negative dispersion element 4. In other words, the pulse light exiting from the negative chirping mirror 4 is mode-locked by the mode locker 9 at a position somewhere between the pair of concave mirrors 7 and 8 where the pulse light is reflected in the mode-locking part 6. As the mode locker 9, for example, a sapphire plate that exhibits a significant optical Kerr effect is used.

The positive chirping mirror 11 is a dispersion element that imparts positive dispersion to the pulse light thus mode-locked. The positive chirping mirror 11 and the negative chirping mirror 4 are configured so as to compensate each other. The pulse light positively chirped by the positive chirping mirror 11 is incident in the optical amplification medium 1 via the mirror 12. An optically amplified positive chirped wide-band pulse ($\omega_c$) is output from the optical amplification medium 1. The positive chirped wide-band pulse ($\omega_c$) is subjected to negative dispersion by the negative chirping mirror 4, whereby a wide-band ultrashort-pulse light ($\omega_o$) is output.

It should be noted that the above description describes only a laser pulse oscillated in one direction, but a laser pulse also is oscillated in an opposite direction, as shown in the drawing.

In the present embodiment, the optical amplification process by the optical amplification medium 1 is utilized as a wide-band gain process. By using the optical amplification medium 1 having a wide band and a large gain as a gain element of a laser oscillator, and disposing a sapphire plate or the like that exhibits a significant optical Kerr effect as the mode locker 9 in the resonator, a mode-locking operation can be obtained in a wide spectrum band. As a result, an ultrashort-pulse light can be generated directly from the resonator.

As described above, in the oscillator according to the present embodiment, the optical amplification medium 1 for obtaining a gain and the mode locker 9 for mode locking are independent from each other, whereby the degree of freedom in the resonator designing is improved. For example, an element having a long crystal length and capable of obtaining a large gain may be selected to form the optical amplification medium 1. Since the mode locker 9 can be thinned to an ultimate limit such that a nonlinear chirp can be ignored, the wavelength dispersion of the resonator can be suppressed to an ultimate limit. Further, since the gain part is provided separately, the gain producing process in a wide band can be utilized.

Even with any configuration that allows the optical amplification medium 1 to be optimal for gain production, it is possible to shorten the incident light pulse to an ultimate limit in the mode locker 9 separated from the optical amplification medium 1. This allows the optical Kerr effect to be induced at the mode locker 9, which enables the Kerr lens mode locking. In order to shorten the light pulse incident in the mode locker 9, the negative chirping mirror 4 is provided as a negative dispersion element for compensating the positive chirping mirror 11 as the positive dispersion element. The negative chirping mirror 4 is configured so as to impart negative dispersion to the pulse light incident in the mode locker 9 so that the pulse light becomes a transform-limited pulse (ultrashort pulse).

As described above, the positive chirping mirror 11 and the negative chirping mirror 4 are used so as to compensate each other so that the optical amplification medium 1 and the mode locker 9, which are provided separately, independently act on the light pulse most effectively, and at the same time this results in that the effect of the chirped pulse amplification is taken into the oscillator. Consequently, the wide-band ultrashort-pulse light ($\omega_o$) can be obtained as an output light from the exiting mirror 5, with a high degree of efficiency.

As described above, this oscillator, when combined with chirped pulse amplification, exhibits a greater power. Further, since a positive chirped light can be taken out directly from the oscillator, a pulse stretcher, which is usual in the chirped pulse amplification method, no longer is needed. Therefore, if the foregoing oscillator is incorporated in an ultrahigh-intensity laser system, a further simplified device can be obtained.

EMBODIMENT 2

Figure 2:
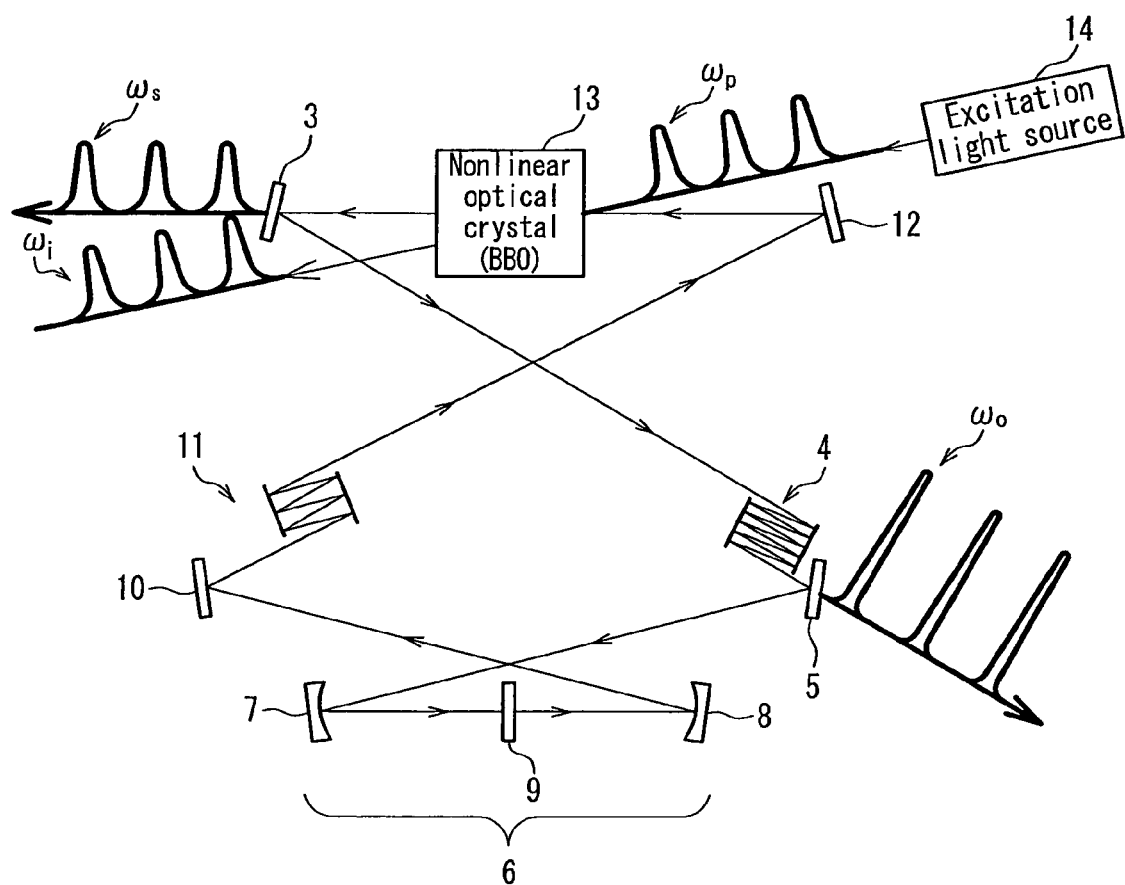
FIG. 2 is a conceptual diagram illustrating a configuration of a wide-band ultrashort-pulse optical oscillator according to Embodiment 2 of the present invention.

FIG. 2 is a conceptual diagram illustrating a configuration of a wide-band ultrashort-pulse optical oscillator according to Embodiment 2 of the present invention. In the present embodiment, the optical parametric amplification process is used. It should be noted that the optical oscillator of the present embodiment has a configuration such that the optical amplification medium 1 and the energy injection element 2 in the optical oscillator shown in FIG. 1 are specified to be a nonlinear optical crystal 13 and an excitation light source 14, respectively. Therefore, other elements are similar to those in the case of the optical oscillator shown in FIG. 1; the same elements as those in FIG. 1 are designated by the same reference numerals, and descriptions thereof are not repeated herein.

In the optical oscillator shown in FIG. 2, a photon energy of an excitation light ($\omega_p$) incident in the nonlinear optical crystal 13 from the excitation light source 14 is converted to photon energies of a signal light ($\omega_s$) and an idler light ($\omega_i$). The signal light ($\omega_s$) exiting from the nonlinear optical crystal 13 is guided to a negative chirping mirror 4 via a mirror 3. The negative chirping mirror 4 imparts negative dispersion to the signal light ($\omega_s$). The signal light ($\omega_s$) negatively chirped is incident in a mode-locking part 6 via a mirror 5.

The signal light ($\omega_s$) from the negative chirping mirror 4 is mode-locked by the mode locker 9 at a position somewhere between a pair of concave mirrors 7 and 8 between which the signal light is reflected. The mode-locked signal light ($\omega_s$) is guided to a positive chirping mirror 11 via a mirror 10. The positive chirping mirror 11 imparts positive dispersion to the mode-locked signal light ($\omega_s$). The signal light ($\omega_s$) thus positively chirped by the positive chirping mirror 11 is incident in the nonlinear optical crystal 13 via a mirror 12.

As the excitation light source 14, for example, a mode-locking YAG picosecond green pulse laser may be used. As the nonlinear optical crystal 13, for example, $\beta$-BaB$_2$O$_4$ (BBO) is used.

In an oscillator of the foregoing configuration, the signal light ($\omega_s$) and the excitation light ($\omega_p$) from the excitation light source 14 are adjusted so as to be incident in the nonlinear optical crystal 13 in a non-coaxial state in which their optical axes cross each other at a certain angle. With this, the optical parametric amplification through the non-coaxial optical parametric oscillation process is performed. In other words, with use of a two-dimensional nonlinear optical crystal, the photon energy of the excitation light ($\omega_p$) is converted to the photon energies of the signal light ($\omega_s$) and the idler light ($\omega_i$). In the present embodiment, the non-coaxial optical parametric oscillation process is utilized as a wide-band gain process. The non-coaxial optical parametric amplification has the following characteristics.

1) As the nonlinear optical crystal 13, $\beta$-BaB$_2$O$_4$ is used, for example, and it is arranged so that the signal light ($\omega_s$) and the excitation light ($\omega_p$) are non-coaxial as described above, with a non-coaxial angle being selected appropriately. This makes it possible to increase the wavelength width of the signal light ($\omega_s$) that can be phase-matched with respect to the excitation light ($\omega_p$) having a single wavelength, and to achieve the optical parametric amplification exhibiting a wide spectrum band of much more than 100 nm. Thus, by utilizing the non-coaxial optical parametric amplification process, the usable band is widened significantly, as compared with the case where a titanium-sapphire laser is used in the amplification process.

2) The gain is determined by a nonlinear constant of the nonlinear optical crystal 13, a peak power of the excitation light ($\omega_p$), and an interaction time of light waves.

By using an optical parametric amplifier having such a wide band and a large gain as the gain element of a laser oscillator and disposing a sapphire plate or the like exhibiting a great optical Kerr effect as the mode locker 9 in the resonator, the mode-locking operation can be achieved in a wide spectrum band of far more than 100 nm. As a result, an ultrashort-pulse light close to a monocycle pulse of less than 4 fs can be generated directly by the resonator.

Since the gain part is provided separately, the non-coaxial optical parametric process with a gain mechanism for a bandwidth more than 100 nm can be utilized as the gain process. Thus, with the oscillator according to the present embodiment, the bandwidth of the ultrashort pulse is determined by the non-coaxial optical parametric amplification process. Therefore, as compared with the case where the bandwidth is determined by the characteristics of the titanium-sapphire crystal, a wider bandwidth is obtained, whereby the degree of freedom in the central wavelength selection is increased.

On the other hand, unlike the laser amplifier, the optical parametric amplification process has a gain only when an excitation light exists. Therefore, a nonlinear optical crystal that is a gain medium has to be excited in a pulse-like form at time intervals determined by a resonator length. To implement this, for example, a mode-locking picosecond green pulse having a repetitive frequency accurately synchronized with a resonator length is used as the excitation light ($\omega_p$).

Further, since in the optical parametric process, the gain maintaining time "is limited to", or "continues during" a time while the excitation pulse exists, the oscillation pulse width and the gain maintaining time tend to mismatch each other, in the case where the oscillator is configured as a normal Kerr lens mode-locking oscillator. As a result, it is almost impossible to achieve the mode-locking oscillation while efficiently utilizing energy of the excitation pulse With the configuration of the present embodiment, the linear chirp can be imparted by the positive chirping mirror 11, and a state in which the pulse width is expanded sufficiently can be achieved by the nonlinear optical crystal 13 as a gain producing portion. Thereby, the oscillation pulse width and the gain maintaining time are matched, whereby a sufficient degree of efficiency can be achieved.

EMBODIMENT 3

Figure 3A:
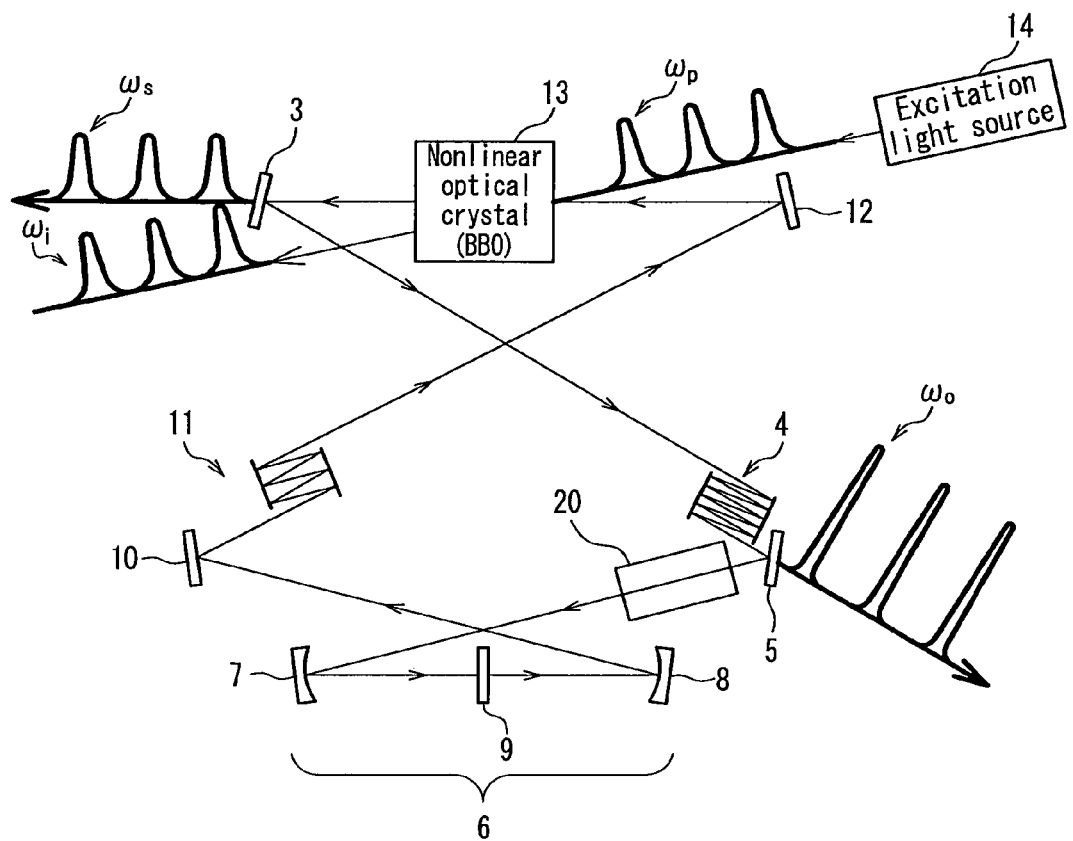
FIG. 3A is a conceptual diagram illustrating a configuration of a wide-band ultrashort-pulse optical oscillator according to Embodiment 3 of the present invention.

FIG. 3A is a conceptual diagram illustrating a configuration of a wide-band ultrashort-pulse optical oscillator according to Embodiment 3 of the present invention. The basic configuration of this oscillator is similar to that shown in FIG. 2; the same elements as those in FIG. 2 are designated by the same reference numerals, and descriptions thereof are not repeated herein.

Figure 3B:
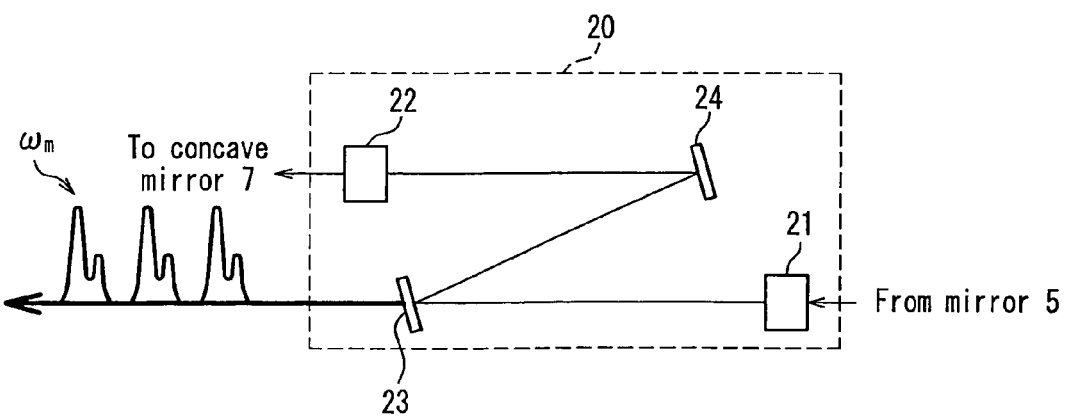
FIG. 3B is a conceptual diagram illustrating a configuration of principal parts of the wide-band ultrashort-pulse optical oscillator.
Figure 4:
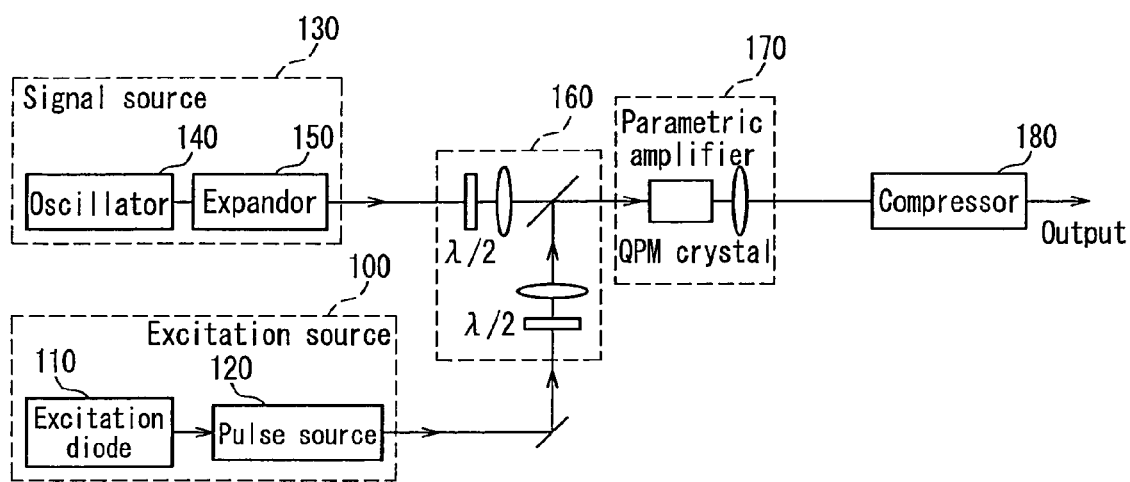
FIG. 4 is a conceptual diagram illustrating a configuration of an ultrashort-pulse optical oscillator utilizing an optical parametric amplification process of a conventional example.

In the present embodiment, a frequency modulation part 20 is disposed between a negative chirping mirror 4 and a mode locker 9. As shown in FIG. 3B, the frequency modulation part 20 is composed of a pair of frequency modulators 21 and 22 in the complementary relationship to each other. Further, exiting mirrors 23 and 24 are disposed, which are for taking a modulated light pulse ($\omega_m$) out between the pair of frequency modulators 21 and 22. As the frequency modulators 21 and 22, for example, frequency modulators utilizing acousto-optic elements may be used.

Thus, by interposing the frequency modulators 21 and 22 that compensate each other, the light pulse is modulated by the frequency modulator 21 in the prior stage, whereby an arbitrary waveform is formed, and the previous waveform is restored in the light pulse by the frequency modulator 22 in the posterior stage. By so doing, a light pulse having an arbitrary waveform can be taken out of the exiting mirror 23, without influence on an action of the oscillator. By taking out a light pulse having an arbitrary waveform, the degree of freedom in various experiments using the light pulse is increased significantly, which is very significant in advancing research.

It should be noted that it also is possible to interpose the above-described frequency modulation part 20 into the basic configuration of the oscillator shown in FIG. 1.

INDUSTRIAL APPLICABILITY

The wide-band ultrashort-pulse optical oscillator of the present invention is capable of generating a wide-band ultrashort-pulse light with a high degree of efficiency, and has a high degree of freedom in the central wavelength selection; hence, it is advantageous for use in an ultrahigh-intensity laser system.

The invention claimed is:

1. A wide-band ultrashort-pulse optical oscillator comprising:
   at least one optical amplification medium that optically amplifies an incident light having a wide band or a plurality of bands so as to be converted into an oscillation light emitted from an optical resonator;
   an energy injection element that either injects energy into the optical amplification medium so that light energy is generated, or injects light energy into the optical amplification medium;
   a negative dispersion element that imparts a negative dispersion to a pulse light of the oscillation light;
   a mode locker that produces a mode-locking with respect to the pulse light;
   a positive dispersion element that imparts a positive dispersion to the pulse light; and
   an optical system formed so that the pulse light passes through a looped optical path from the optical amplification medium via the negative dispersion element, the mode locker, and the positive dispersion element, back to the optical amplification medium in at least one of a stated direction and an opposite direction.

2. The wide-band ultrashort-pulse optical oscillator according to claim 1, wherein the optical amplification medium is a nonlinear optical crystal for converting the light energy by optical parametric amplification, and
   an excitation light source is provided for supplying the nonlinear optical crystal with an excitation light for the optical parametric amplification.

3. The wide-band ultrashort-pulse optical oscillator according to claim 2, wherein
   the pulse light passes through the loop-like optical path in the stated direction,
   the negative dispersion element imparts a negative dispersion to the pulse light exiting from the optical amplification medium,
   the mode locker produces a mode-locking with respect to the pulse light dispersed negatively by the negative dispersion element, and
   the positive dispersion element imparts a positive dispersion to the pulse light mode-locked by the mode locker.

4. The wide-band ultrashort-pulse optical oscillator according to claim 2, wherein the excitation light source and the optical system are arranged so that the pulse light and the excitation light are incident in the nonlinear optical crystal in a non-coaxial relation so that respective optical axes of the pulse light and the excitation light cross each other at a predetermined angle, whereby amplification is produced through a non-coaxial optical parametric oscillation process.

5. The wide-band ultrashort-pulse optical oscillator according to claim 1, wherein the positive dispersion element and the negative dispersion element have complementary effects to each other.

6. The wide-band ultrashort-pulse optical oscillator according to claim 1, wherein the negative dispersion element imparts a negative dispersion to the pulse light so that a transform-limited pulse is formed.

7. The wide-band ultrashort-pulse optical oscillator according to claim 1, wherein chirping mirrors are used as the negative dispersion element and the positive dispersion element.

8. The wide-band ultrashort-pulse optical oscillator according to claim 1, wherein, between the negative dispersion element and the mode locker, a pair of frequency modulators that are in a complementary relationship with each other are interposed, and an exiting mirror is disposed for taking out a pulse light from between the pair of frequency modulators.

* * * * *